(12) United States Patent
De Mastri

(10) Patent No.: US 11,886,607 B1
(45) Date of Patent: Jan. 30, 2024

(54) APPARATUS AND METHOD CONFIGURED TO FACILITATE THE SELECTIVE SEARCH OF A DATABASE

(71) Applicant: Change Healthcare Holdings, LLC, Nashville, TN (US)

(72) Inventor: John De Mastri, Chicago, IL (US)

(73) Assignee: CHANGE HEALTHCARE HOLDINGS, LLC, Nashville, TN (US)

(*) Notice: Subject to any disclaimer, the term of this patent is extended or adjusted under 35 U.S.C. 154(b) by 973 days.

(21) Appl. No.: 16/353,507

(22) Filed: Mar. 14, 2019

(51) Int. Cl.
 *G06F 21/62* (2013.01)
 *G06F 16/24* (2019.01)
 *G06F 16/22* (2019.01)
 *G06F 16/245* (2019.01)

(52) U.S. Cl.
 CPC ...... *G06F 21/6227* (2013.01); *G06F 16/2282* (2019.01); *G06F 16/245* (2019.01)

(58) Field of Classification Search
 USPC .................................................. 707/999.001
 See application file for complete search history.

(56) References Cited

U.S. PATENT DOCUMENTS

| | | | | |
|---|---|---|---|---|
| 8,949,939 | B2* | 2/2015 | Peddada | H04L 63/105 |
| | | | | 726/4 |
| 2008/0301168 | A1* | 12/2008 | Adler | G06F 16/86 |
| | | | | 707/999.102 |
| 2017/0277747 | A1* | 9/2017 | Tremayne | H03M 7/60 |
| 2020/0134229 | A1* | 4/2020 | Ranger | H04L 63/0428 |

OTHER PUBLICATIONS

Ninghui Li; Oblivious Signature-Based Envelope; 2003; ACM; pp. 182-189 (Year: 2003).*

* cited by examiner

*Primary Examiner* — Albert M Phillips, III
*Assistant Examiner* — Jermaine A Mincey
(74) *Attorney, Agent, or Firm* — Myers Bigel, P.A.

(57) ABSTRACT

An apparatus, method and computer program product facilitate selective searching of at least a portion of a database. With respect to a method, a query is received that has a query context. In response to the query, the method reviews one or more data source tables including a first data source table that defines each of a plurality of data sources of data stored by the database. In reviewing the one or more data source tables, the method identifies one or more data sources that are accessible in response to the query. The method also searches the database for responsive data that: (i) was provided by the one or more data sources that were identified to be accessible in response to the query and (ii) is responsive to the query. Further, the method responds to the query with a representation of the responsive data.

16 Claims, 5 Drawing Sheets

| ID | Source Org | Data Type | Sourcing App | Normalization | Policy Mapping |
|---|---|---|---|---|---|
| 1 | Company X | 270/271 Data | CNC | | 1, 2 |
| 2 | Company Y | 270/271 Data | Audit | | 3, 4, 5 |
| 3 | Company X | Payments Data | Payments | | 6, 7, 8, 9 |

Figure 3A

| ID | Requesting Organization | Requesting User Role | Requesting App | PoU | Form of Data | Access Type | Data Source Mapping |
|---|---|---|---|---|---|---|---|
| 1 | Company 1 | All | CNC | All | Full PHI | Full | 1 |
| 2 | Company 1 | All | Audit | Analytics | de-ID | Read | 1 |
| 3 | Company 1 | All | Audit | All | Full PHI | Full | 2 |
| 4 | Company 1 | All | CNC | Analytics | de-ID | Read | 2 |
| 5 | Company Y | Audit | Audit | Audit | Full PHI | Read | 2 |
| 6 | Company 1 | All | Payments | All | Full PHI | Full | 3 |
| 7 | Company X | All | Audit | All | Full PHI | Read | 3 |
| 8 | Company X | All | CNC | Audit | Full PHI | Read | 3 |
| 9 | Company X | Payments | CNC | Audit | Full PHI | Deny | 3 |

Figure 3B

| ID | Requesting Organization | Trust Relationship | Default |
|---|---|---|---|
| 1 | Company X | Company X Parent, Company 2 Sub 1 | Allow all 271 data |
| 2 | Company X | Proxy Company 3 | Allow all 271 data |

APPARATUS AND METHOD CONFIGURED TO FACILITATE THE SELECTIVE SEARCH OF A DATABASE

TECHNOLOGICAL FIELD

A method, apparatus and computer program product are provided in accordance with an example embodiment in order to facilitate the selective search of a database and, more particularly, to the selective search of a database in a manner that is consistent with the policies that govern access to data from different sources that is stored within the database.

BACKGROUND

Substantial quantities of data are generated and maintained in a variety of different industries and for a number of different applications. The data is useful not only for historical reference purposes, but sophisticated data analytics are being developed in order to make predictions based upon or otherwise learn from the data that has been generated and maintained. As such, many users desire access to the data, either in its original form or in a de-identified and/or aggregated form.

However, data that is maintained by a database or other memory device has often times been provided to the entity that now maintains the data with certain access restrictions associated with the data. These access restrictions may be defined, for example, by a contract or other agreement between the entity that provides the data and the entity that now maintains the data. Additionally or alternatively, the access restrictions may be imposed by regulations, such as governmental regulations that govern the data generated within a particular industry and/or data of a particular data type. These access restrictions may come in various forms and may limit, for example, the users to whom the data may be provided, the applications for which the data may be utilized and/or the form in which the data is provided, such as in a de-identified or aggregated form.

In order to comply with the various access restrictions, data rights management systems have been developed. At least some data rights management systems store the data such that all data within a database is subject to the same access restrictions, such as access restrictions that limit the users who can access the data to users who can provide appropriate authentication credentials and/or users who serve in an authorized role within a requesting organization. However, in situations in which at least some of the data stored by a database is subject to different and non-uniform access restrictions, data rights management systems that are in receipt of a query from a user must generally review all of the data within the database as well as the access restrictions associated with the data in order to determine the data that is both responsive and able to be provided pursuant to the access restrictions imposed upon the data. The review of the data within the database can be resource-intensive by requiring substantial processing resources and time to conduct a thorough review of the data within the database as well as an analysis of the access restrictions associated with the data. These demands on processing resources and time are only expected to increase as the quantity of data and number of contractual relationships continue to grow in the future, thereby imposing even greater demands upon data rights management systems, particularly in instances in which both the quantity of data and the number of contractual relationships increase.

BRIEF SUMMARY

An apparatus, method and computer program product are provided in accordance with an example embodiment in order to facilitate selective searching of at least a portion of a database. By providing for selective searching of a database, the apparatus, method and computer program product of an example embodiment may honor the access restrictions to which the data stored by the database are subject, but may do so in an efficient manner that conserves processing resources and time. As such, the apparatus, method and computer program product of an example embodiment provide technological improvements with respect to the searching of a database and the provision of data in accordance with access restrictions to which the data is subject by utilizing data source tables that permit the data sources that have provided data to the database that is subject to access restrictions that permit the data to be shared in response to a query to first be identified in order to limit the search of the database to a subset of the data stored by the database that was provided by the data sources that have been identified.

In an example embodiment, a method is provided for selectively searching at least a portion of a database. The method includes receiving a query having a query context including one or more of requesting application, data type, purpose of use or requesting user context, such as at least one of requesting organization or requesting user role. In response to the query, the method reviews one or more data source tables including a first data source table that defines each of a plurality of data sources of data stored by the database. The first data source table separately identifies, for each of the plurality of data sources, one or more of a source organization, a data type, a sourcing application or a purpose of use for the data provided by the respective data source. In reviewing the one or more data source tables, the method identifies one or more data sources that are accessible in response to the query. The method also searches at least the portion of the database for responsive data that: (i) was provided by the one or more data sources that were identified to be accessible in response to the query and (ii) is responsive to the query. Further, the method responds to the query with a representation of the responsive data.

The method of an example embodiment searches at least the portion of the database for responsive data by searching only the portion of the database that stores data that was provided by the one or more data sources that were identified to be accessible in response to the query without searching other portions of the database that store data provided by one or more other data sources. In an example embodiment, the method also includes constructing a security envelope in response to receipt of the query. The security envelope for a respective query includes the query context including one or more of the requesting user context, the requesting application, the data type or the purpose of use. In this example embodiment, reviewing the one or more data source tables includes reviewing the one or more data source tables based upon the security envelope constructed for the query.

In an example embodiment, the one or more data source tables also include a second data source table that identifies, for each of the one or more data sources, one or more policies defining use of the data provided by a respective data source. In this example embodiment, identifying one or more data sources that are accessible includes identifying the one or more data sources having one or more policies that are satisfied by the query. The method of an example embodiment searches at least the portion of the database for responsive data and responds to the query with a representation of the responsive data in a manner that is in compliance with the one or more policies that are identified to govern accessibility of the responsive data in response to the query. The one or more data source tables of an example embodiment also include a third data source table that identifies one or more entities that have a trust relationship with a requesting organization. The method of this example embodiment also includes identifying one or more entities that have a trust relationship with the requesting organization. In this example embodiment, the method identifies one or more data sources that are accessible in response to the query in a manner that is in compliance with the one or more entities that are identified to have a trust relationship with the requesting organization.

In another example embodiment, an apparatus is provided that is configured to selectively search at least a portion of a database. The apparatus includes a memory device configured to store one or more data source tables including a first data source table that defines each of a plurality of data sources of data stored by the database. The first data source table separately identifies, for each of the plurality of data sources, one or more of a source organization, a data type, a sourcing application or a purpose of use. The apparatus also includes processing circuitry configured to receive a query having a query context including one or more of requesting user context, requesting application, data type or purpose of use. In response to the query, the processing circuitry is also configured to review the one or more data source tables including the first data source table in order to identify one or more data sources that are accessible in response to the query. Further, the processing circuitry is configured to search at least the portion of the database for responsive data that: (i) was provided by the one or more data sources that were identified to be accessible in response to the query and (ii) is responsive to the query, and to respond to the query with a representation of the responsive data.

The processing circuitry of an example embodiment is configured to search at least the portion of the database for responsive data by searching only the portion of the database that stores data that was provided by the one or more data sources that were identified to be accessible in response to the query without searching other portions of the database that store data provided by one or more other data sources. In an example embodiment, the processing circuitry is further configured to construct a security envelope in response to receipt of the query. The security envelope for a respective query includes the query context including one or more of the requesting user context, the requesting application, the data type or the purpose of use. The processing circuitry of this example embodiment is configured to review the one or more data source tables by reviewing the one or more data source tables based upon the security envelope constructed for the query.

The one or more data source tables of an example embodiment also include a second data source table that identifies, for each of the one or more data sources, one or more policies defining use of the data provided by a respective data source. In this example embodiment, the processing circuitry is configured to identify one or more data sources that are accessible by identifying the one or more data sources having one or more policies that are satisfied by the query. The processing circuitry of this example embodiment is configured to search at least the portion of the database for responsive data and to respond to the query with a representation of the responsive data in a manner that is in compliance with the one or more policies that are identified to govern accessibility of the responsive data in response to the query.

In an example embodiment, the one or more data source tables also include a third data source table that identifies one or more entities that have a trust relationship with a requesting organization. The processing circuitry of this example embodiment is further configured to identify one or more entities that have a trust relationship with the requesting organization. In this example embodiment, the processing circuitry is configured to identify one or more data sources that are accessible in response to the query in a manner that is performed in compliance with the one or more entities that are identified to have a trust relationship with the requesting organization.

In a further example embodiment, a method is provided for facilitating a selective search of at least a portion of a database. The method includes storing a plurality of data source tables including a first data source table that defines each of a plurality of data sources of data stored by the database and a second data source table that identifies, for each of the one or more data sources, one or more policies defining use of the data provided by a respective data source. The first data source table separately identifies, for each of the plurality of data sources, one or more of a source organization, a data type, a sourcing application or a purpose of use. The method also includes receiving information regarding each of the plurality of data sources that provide data to be stored by the database. In response to the information that is received and for each of the plurality of data sources, the method populates the first data source table with one or more of a source organization, a data type, a sourcing application or a purpose of use of the data provided by a respective data source. In response to the information that is received and for each of the plurality of data sources, the method populates the second data source table with information regarding the policies defining use of the data provided by a respective data source. Further, the method establishes a link between one or more policies of the second data source table and the respective data source of the first data source table.

The method of an example embodiment also includes storing the data provided by the plurality of data sources in the database, which is separate from the memory device that stores the plurality of data source tables. In this example embodiment, the method modifies one or more of the data source tables stored by the memory device without modifying the data stored by the database. The method of an example embodiment also populates the first data source table with normalization rules for the data provided by a respective data source. In this example embodiment, the method also normalizes the data received from the respective data store prior to storing the data in the database. The plurality of data source tables stored by the memory device of an example embodiment also include a third data source table that identifies one or more entities that have a trust relationship with a requesting organization.

In yet another example embodiment, an apparatus is provided that is configured to facilitate a selective search of at least a portion of a database. The apparatus includes a memory device configured to store a plurality of data source tables including a first data source table that defines each of a plurality of data sources of data stored by the database and a second data source table that identifies, for each of the one or more data sources, one or more policies defining use of the data provided by a respective data source. The first data source table separately identifies, for each of the plurality of data sources, one or more of a source organization, a data type, a sourcing application or a purpose of use. The apparatus also includes processing circuitry configured to receive information regarding each of the plurality of data sources that provide data to be stored by the database. In response to the information that is received and for each of the plurality of data sources, the processing circuitry is configured to populate the first data source table with one or more of a source organization, a data type, a sourcing application or a purpose of use of the data provided by a respective data source. In response to the information that is received and for each of the plurality of data sources, the processing circuitry is configured to populate the second data source table with information regarding the policies defining use of the data provided by a respective data source. Further, the processing circuitry is configured to establish a link between one or more policies of the second data source table and the respective data source of the first data source table.

An apparatus of an example embodiment also includes the database, separate from the memory device that stores the plurality of data source tables, configured to store the data provided by the plurality of data sources. In this example embodiment, the processing circuitry is configured to modify one or more of the data source tables stored by the memory device without modifying the data stored by the database. The processing circuitry of an example embodiment is further configured to populate the first data source table with normalization rules for the data provided by a respective data source. In this example embodiment, the processing circuitry is configured to normalize the data received from the respective data store prior to storing the data in the database. The plurality of data source tables stored by the memory device of an example embodiment also include a third data source table that identifies one or more entities that have a trust relationship with a requesting organization.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale and wherein:

FIG. 3A is a representation of a first data source table that defines each of a plurality of data sources of the data stored by the database in accordance with an example embodiment of the present disclosures;

FIG. 3B is a representation of a second data source table that identifies, for each of the one or more data sources, one or more policies defining the use of the data provided by the respective data sources in accordance with an example embodiment of the present disclosure;

DETAILED DESCRIPTION

Figure 1:
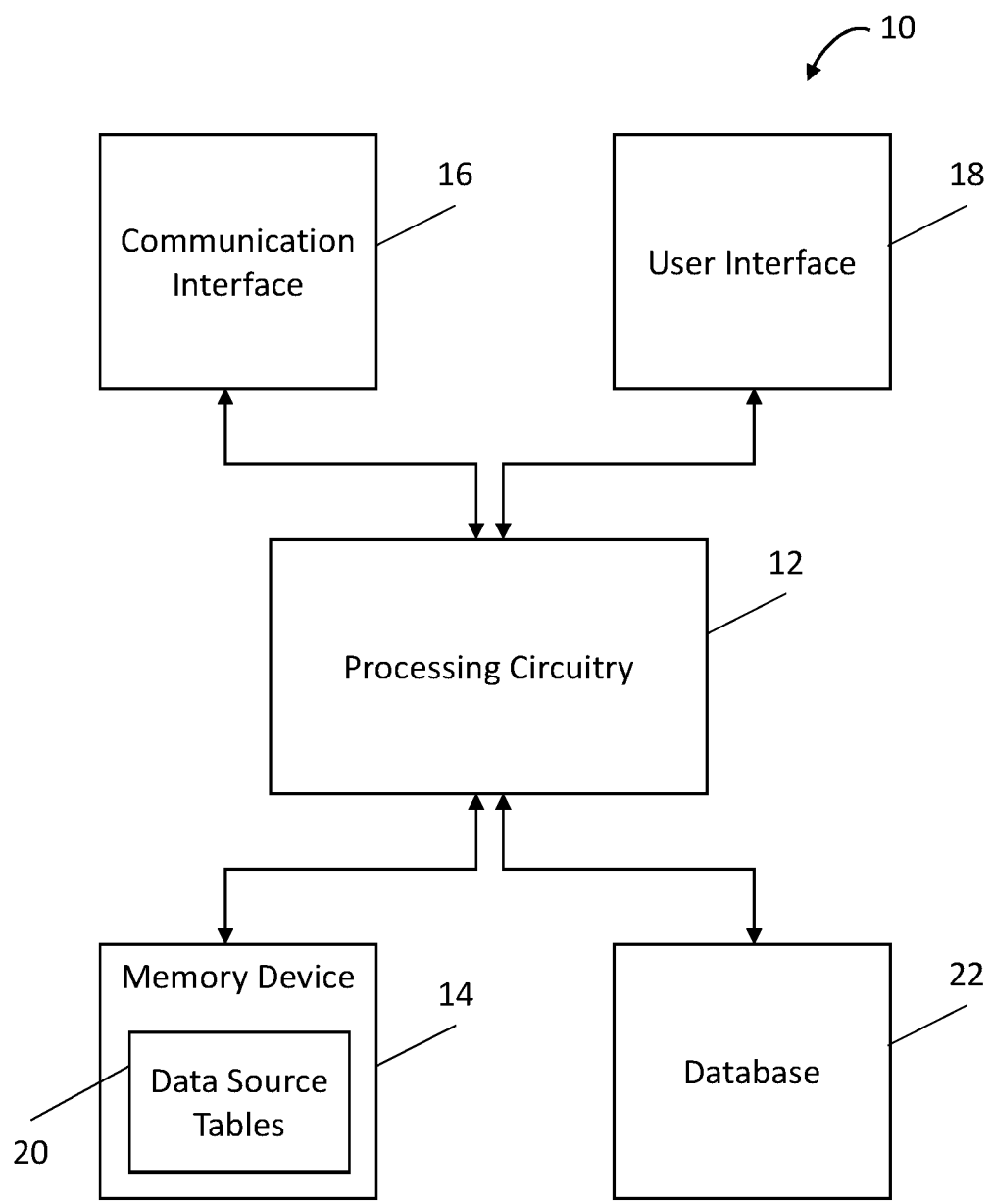
FIG. 1 is a block diagram of an apparatus configured in accordance with an example embodiment to facilitate the selective search of at least a portion of the database.

Some embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

An apparatus, method and computer program product are provided in accordance with an example embodiment in order to facilitate the selective searching of at least a portion of a database. By providing for the selective searching of a database, the search may be conducted in an efficient manner, thereby conserving processing resources and time. Moreover, the apparatus, method and computer program product of an example embodiment provide for the selective search of the database in a manner that honors the access restrictions associated with the data stored by the database, even in instances in which the data is subject to a wide variety of different types of access restrictions. Thus, the apparatus, method and computer program product of an example embodiment provide an efficient and flexible mechanism for implementing data rights management such that the data may be stored and accessed in compliance with the access restriction, while still permitting users to have access to and use of data in the manner contemplated by the access restrictions, thereby permitting the data to be leveraged, such as via data analytics, in a manner consistent with the access restrictions imposed upon the data.

In order to facilitate the selective searching of at least a portion of a database, the apparatus, method and computer program product of an example embodiment construct one or more data source tables relating to the data stores that provide the data that is to be stored by the database and the policies that define the access restrictions imposed upon the data. Additionally, the apparatus, method and computer program product of another example embodiment of the present disclosure utilize the one or more data source tables in response to a query in order to efficiently identify the data stored by the database that is responsive to the query and that has access restrictions that would permit the provision of at least some form of the data in response to the query. However, the apparatus, method and computer program product of this example embodiment of the present disclosure do not require that all of the data of the database be searched and, instead, focus the search upon the data identified by the one or more data source tables to have access restrictions defined by policies that are satisfied by the query without searching other data stored by the database that is subject to access restrictions defined by policies that are not satisfied by the query and, as such, could not be provided in response to the query. Additionally, in an instance in which multiple search requests are received, the plurality of searches may be performed in parallel, thereby additionally reducing the overall processing and response time.

Referring now to FIG. 1, an apparatus 10 in accordance with an example embodiment of the present disclosure is depicted. The apparatus of an example embodiment may be embodied by any of a variety of devices. Example embodiments may include any of a variety of fixed terminals, such as servers, desktop computers, mainframe devices, kiosks, or the like. Such example devices may additionally or alternatively comprise any of a variety of mobile terminals, such as portable digital assistants (PDAs), mobile telephones, smartphones, laptop computers, tablet computers, or any combinations of the aforementioned devices. Alternatively, the apparatus may be distributed amongst a plurality of networked devices.

The apparatus 10 includes processing circuitry 12 and a memory device 14 configured to store a plurality of data source tables, as described below. The memory device is non-transitory and may include, for example, one or more volatile and/or non-volatile memories. In other words, for example, the memory device may be an electronic storage device (e.g., a computer readable storage medium). The memory device may be configured to store information, data, content, applications, software instructions, or the like, for enabling the apparatus to carry out various functions in accordance with example embodiments contemplated herein. As described below and as shown in FIG. 1, the memory device is also configured to store one or more data source tables 20.

The processing circuitry 12 is configured to populate the one or more data source tables stored to by the memory device 14 and to thereafter permit searching of data provided by data sources identified by the one or more data source tables and provision of the data or some form of the data in response to a query with the data being provided in a manner consistent with the access restrictions imposed upon the data as defined by the policies identified by the one or more data source tables. The processing circuitry of an example embodiment may be in communication with the memory device 14 via a bus for passing information among components of the apparatus 10. The processing circuitry may be embodied in a number of different ways and may, for example, include one or more processing devices configured to perform independently. Additionally or alternatively, the processing circuitry may include one or more processors configured in tandem via a bus to enable independent execution of software instructions, pipelining, and/or multithreading. The use of the terms "processor" or "processing circuitry" may be understood to include a single core processor, a multi-core processor, multiple processors of the apparatus, remote or "cloud" processors, or any combination thereof.

In an example embodiment, the processing circuitry 12 may be configured to execute software instructions stored in the memory 14 or otherwise accessible to the processing circuitry. Alternatively or additionally, the processing circuitry may be configured to execute hard-coded functionality. As such, whether configured by hardware or software methods, or by a combination of hardware with software, the processing circuitry may represent an entity (e.g., physically embodied in circuitry) capable of performing operations according to an embodiment of the present invention while configured accordingly. Alternatively, as another example, when the processing circuitry is embodied as an executor of software instructions, the software instructions may specifically configure the processing circuitry to perform the algorithms and/or operations described herein when the software instructions are executed.

As shown in FIG. 1, the apparatus 10 also optionally includes, is associated with or is otherwise in communication with a communications interface 16 and/or a user interface 18. The communications interface may be any means such as a device or circuitry embodied in either hardware or a combination of hardware and software that is configured to receive and/or transmit data from/to a network and/or any other device, circuitry, or module in communication with the apparatus 10. In this regard, the communications interface may include, for example, a network interface for enabling communications with a wired or wireless communication network. For example, the communications interface may include one or more network interface cards, antennas, buses, switches, routers, modems, and supporting hardware and/or software, or any other device suitable for enabling communications via a network. Additionally or alternatively, the communication interface may include the circuitry for causing transmission of such signals to a network or to handle receipt of signals received from a network.

In some embodiments, the apparatus 10 may optionally include a user interface 18 configured to provide output to a user and, in some embodiments, to receive an indication of user input. The user interface may include a display, a keyboard, a mouse, a touch screen, touch areas, soft keys, a microphone, a speaker, and/or other input/output mechanisms. The user interface may utilize the processing circuitry 12 to control one or more functions of the user interface through software instructions (e.g., application software and/or system software, such as firmware) stored on a memory (e.g., memory 14) accessible to the processing circuitry.

In the illustrated embodiment, the apparatus 10 also includes a database 22 configured to store the data provided by one or more data sources. As shown in FIG. 1, the database may be distinct and separate from the memory device 14 that stores the one or more data source tables 20. While the database is depicted to be a component of the apparatus in the embodiment to FIG. 1, the database may be separate from the apparatus, such as by being distinct and separate from the processing circuitry 12 and the memory device of the apparatus, and maintained remotely, such as in a cloud storage system, a server farm or the like with which the apparatus, such as the processing circuitry, is in communication via the communication interface 16.

The database 22 is configured to store a wide variety of data from one or more data sources and subject to various policies that govern the access restrictions imposed upon the data. In an example embodiment, the data is healthcare data, such as data relating to healthcare transactions, e.g., healthcare transactions that are submitted to an insurance company or other payor in order to obtain payment or a reimbursement of medical expenses incurred by a patient. However, the data that is stored by the database may include other types of healthcare data and/or data relating to other industries including, for example, data relating to the telecommunications industry, utilities industry, the media or content distribution industry or the like.

Figure 2:
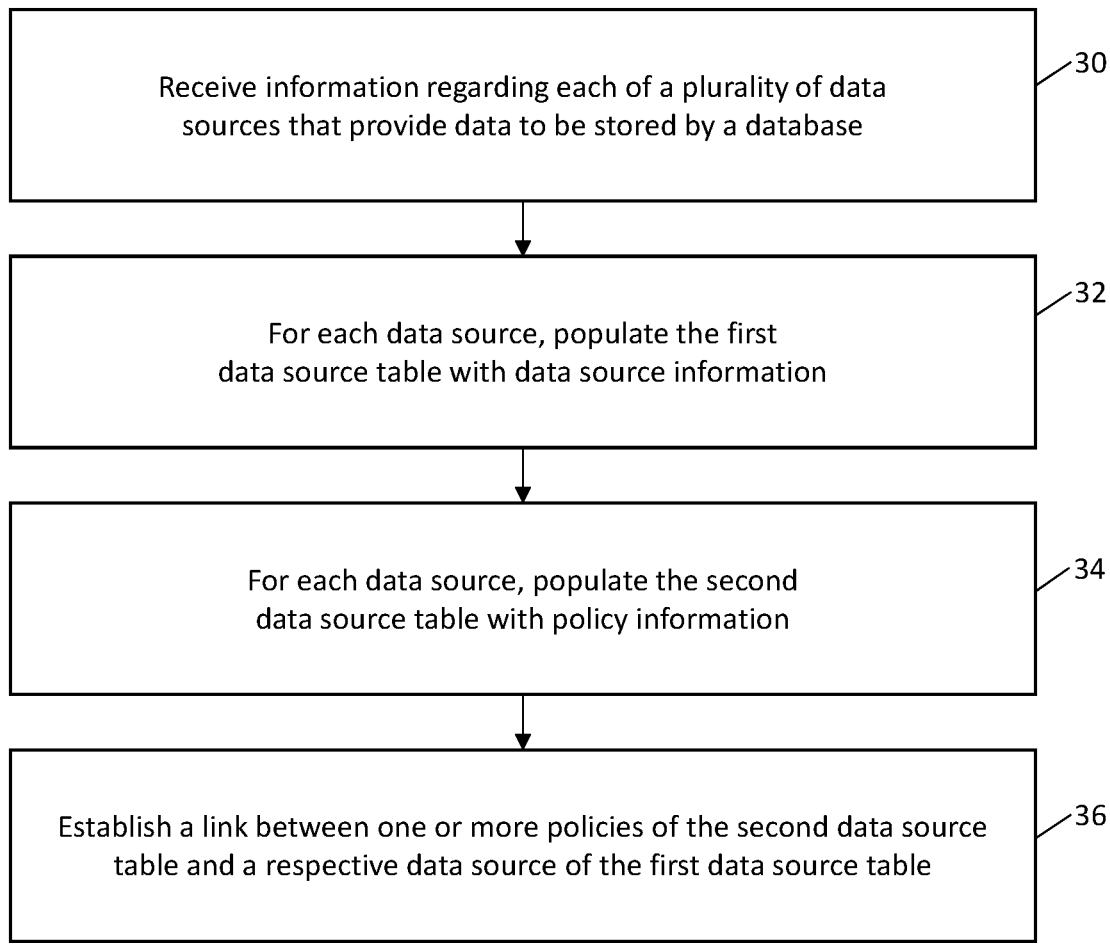
FIG. 2 is a flow chart illustrating operations performed, such as by the apparatus of FIG. 1, in order to populate a plurality of data source tables in accordance with an example embodiment of the present disclosure.

Referring now to FIG. 2, the operations performed, such as by the apparatus 10 of FIG. 1, in order to facilitate the selective search of at least a portion of the database 22, such as by populating a plurality of data source tables, are depicted. As shown in block 30 of FIG. 2, the apparatus includes means, such as the processing circuitry 12, the communication interface 16 or the like, configured to receive information regarding each of the plurality of data sources that provide data to be stored by the database. The information may be provided by a data source concurrent with the provision of the data from the data source, such as by providing the information in the header that proceeds the data file or in a separate file that is provided in conjunction with the data file. Alternatively, the information regarding each of that data sources may be received at a different time than the time at which the data is received from the respective data sources. In this regard, the information regarding each of the plurality of data sources may be provided in advance of or subsequent to receipt of the data from the respective data sources. However, the information regarding a data source must be provided prior to the data from the respective data source being available in response to a query. In other words, data provided by a data source for which the additional information has not yet been provided will be inaccessible until the information is subsequently provided.

For each of the data sources of the data to be stored by the database 22, the apparatus 10 includes means, such as the processing circuitry 12 or the like, configured to populate a first data source table in response to the information that is received from a respective data source. See block 32 of FIG. 2. In this regard, the first data source table is one of the plurality of data source tables 20 stored by the memory device 14. The first data source table defines each of the plurality of data sources that provide the data to be stored by the database. For example, the first data source table may include a plurality of records or entries, one of which is associated with each of the plurality of data sources that provides data for storage by the database.

The processing circuitry 12 of this example embodiment is configured to populate the first data source table with at least some of the information that is provided by a respective data source. Thus, the first data source table, such as the entry or record associated with a respective data source, may be populated with one or more of the source organization, the data type or the sourcing application of the data provided by the respective data source. In this regard, the source organization identifies the respective data source. In conjunction with an embodiment that is configured to store and search healthcare data, the source organization may be an insurance company or other third party payor. The data type identifies the type of data. With respect to healthcare data, the type of data may be, for example, 270/271 data associated with a patient eligibility and benefit inquiry and response or payments data representative of payment information. The sourcing application identifies the application of the source organization that is providing the data to be stored by the database 22. In an example embodiment relating to healthcare data, the sourcing application may be a payments application, a clinical network clearinghouse application, an audit application or the like. An example of a first data source table populated in accordance with an example embodiment as described above is depicted in FIG. 3A. While the first data source table described above and shown in FIG. 3A includes a plurality of data fields, the first data source table may include different fields, such as more or less fields, in other example embodiments.

In an example embodiment, the apparatus 10 includes means, such as the processing circuitry 12 or the like, confirmed to populate the first data source table with normalization rules for the data provided by a respective data source. In this regard, the entry or record of the first data source table associated with a respective data source may include an additional field as shown in FIG. 3A that identifies the normalization rules for the data provided by the respective data source. The normalization rules serve to translate data to a common format. Various normalization rules may be defined. For example, in an instance in which a first provider references a patient by "PatientName", a second provider references a patient by "Customer" and other providers may reference the patient as "Patient", the normalization rules may translate each of these representations to a common format, e.g., "Patient". In this example embodiment, the apparatus includes means, such as the processing circuitry or the like, to normalize the data received from the respective data source prior to storing the data in the database 22. The normalization rules may be identical for all data that is stored by the database. Alternatively, the normalization rules may vary, such as by data type, data source or based upon one or more other parameters. In an example embodiment, both the normalized data as well as the original form in which the data was provided are stored.

As shown in block 34 of FIG. 2, the apparatus 10 of this example embodiment also includes means, such as the processing circuitry 12 or the like, for populating, in response to the information that is received, a second data source table of the plurality of data source tables 20 stored in the memory device 14 with information regarding each of the plurality of data sources that provide data for storage by the database. The second data source table identifies, for each of the one or more data sources, one or more policies defining the use of the data provided by a respective data source. As shown in FIG. 3B, the second data source table of an example embodiment includes a plurality of entries or records, one of which is associated with each policy defining the use of the data, such as by defining the access restrictions imposed upon the data, provided by a respective data source.

Although the second data source table may be configured in various manners, the second data source table of the illustrated embodiment is populated by the processing circuitry 12 with information regarding the policies defining the use of the data provided by a respective data source. This information regarding a policy may vary depending upon the data source that is providing the data. However, in an example embodiment depicted in FIG. 3B, the information with which the second data source table is populated includes, for each policy, the requesting user context, such as the requesting organization and/or the role of the requestor, the requesting application, the purpose of use (PoU) for the requested data, access restrictions on the data and/or the form of the data that is to be provided. In this regard, the requesting organization identifies the entity that may be provided with the data and the role of the requestor identifies whether the requestor who is provided with the data must have a particular role, such as an auditor or a role with payments, or if the requestor may be provided with the data regardless of the role, such as designated by All. The requesting application identifies the application of the requesting organization to which the data may be provided. In an example embodiment relating to healthcare data, the requesting application may be a payments application, a clinical network clearinghouse application, an audit application or the like. With respect to the PoU of the data provided via the respective policy, the policy may identify the purpose for which the data that is stored by the database may be used, such as by indicating that the data is able to be used for all purposes, e.g., All, or by indicating that the use of the data is limited in various manners, such as by limiting to use for payment purposes, for analytic purposes or the like.

With respect to the form of the data that is to be provided, the data may be provided in its entirety, as designated by full protected health information (PHI) or the data may be provided in a de-identified (de-ID) or aggregated form. Finally, the access restrictions imposed upon the data that is provided pursuant to the policy may indicate that the requesting entity may have full access, e.g., read/write access, to the requested data, as designated by Full, or the access may be more limited, such as Read only access. Still further, the access restrictions may be negative access restrictions that indicate that in an instance in which the conditions imposed by the policy are satisfied, access to the requested data is to be denied, as shown by Policy 9 of FIG. 3B. In an instance, in which the same data is subject to both access restrictions that are satisfied and purport to allow access to the data and negative access rights that are satisfied and deny access to the data, the negative access rights supersede the other access rights, such that access to the data is denied, notwithstanding the satisfaction of other access rights that purport to allow access to the data.

As shown in block 36 of FIG. 2, the apparatus 10 of an example embodiment also includes means, such as the processing circuitry 12, the memory device 14 or the like, configured to establish a link between one or more of the policies of the second data source table and the respective data source of the first data source table. Thus, the processing circuitry of an example embodiment links the entry or record of a respective data source in the first data source table with the one or more policies imposed by the respective data source that are represented by different entries or records of the second data source table. This linkage may be defined in various manners including additional fields in one or both of the first and second data source tables indicating the entries or records of the other data source table that are linked thereto. As shown in FIGS. 3A and 3B, Record 1 associated with Company X in the first data source table is linked to two policies designated Records 1 and 2 in the second data source table. Similarly, Record 2 associated with Company Y in the first data source table is linked to three policies designated Records 3, 4 and 5 in the second data source table and Record 3 also associated with Company X in the first data source table is linked to four policies designated Records 6-9 in the second data source table.

In an example embodiment, the apparatus 10 also includes means, such as the processing circuitry 12 or the like, to populate a third data source table of the plurality of data source tables 20 stored by the memory device 14. The third data source table identifies, for at least some of the one or more data sources, one or more entities that have a trust relationship with a requesting organization. The trust relationship identifies one or more other entities that are permitted to be granted access in the same manner and under the same conditions as a respective requesting organization. As such, the one or more other entities that have a trust relationship with a requesting organization effectively serve as proxies for the requesting organization with respect to access to the data.

Figures 3C, 4:
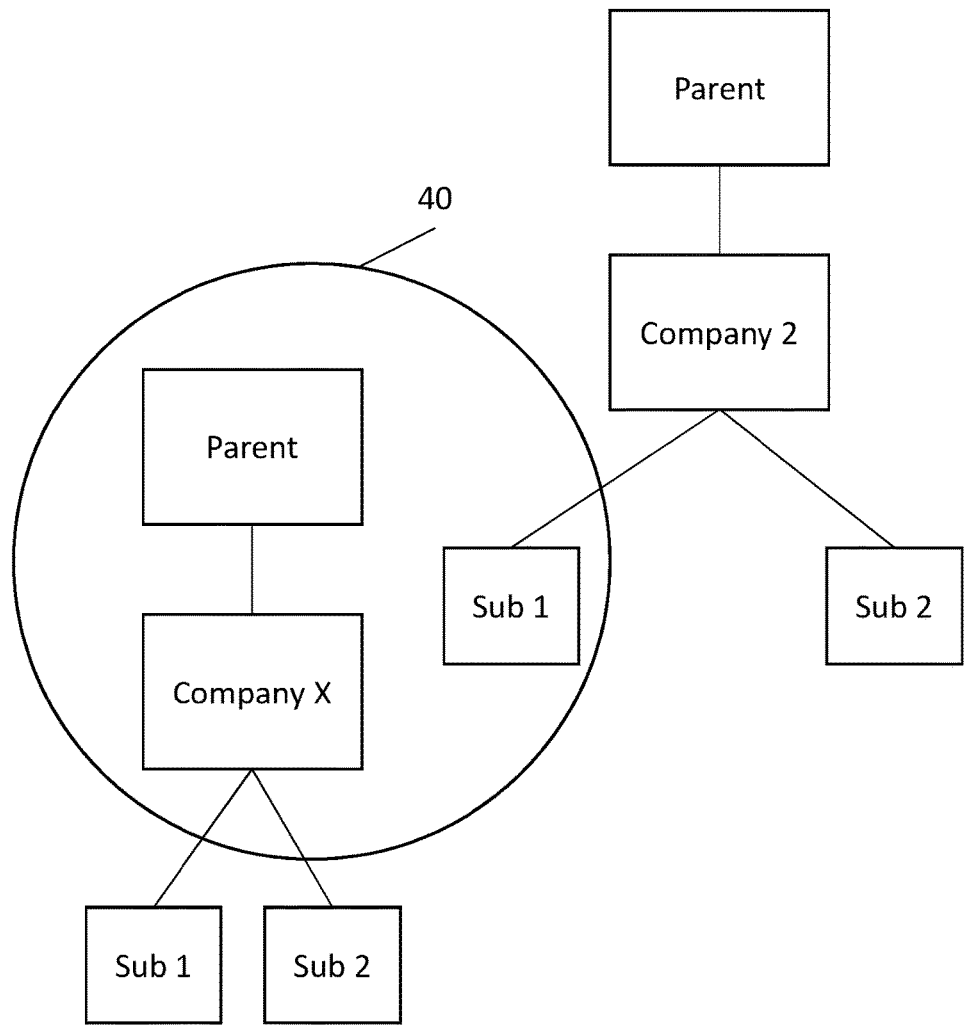
FIG. 3C is a representation of a third data source table that identifies, for at least some of the one or more data sources, one or more entities that have a trust relationship with a requesting organization in accordance with an example embodiment of the present disclosure.
FIG. 4 is a graphical representation of a plurality of entities which illustrate the other entities that have a trust relationship with a requesting organization in accordance with an example embodiment of the present disclosure.

A trust relationship between a requesting organization and another entity may be established in various manners. For example, the trust relationship may be established based upon a familial corporate relationship between the requesting organization and the other entity. For example, in an instance in which a subsidiary is the requesting organization, the parent corporation of the subsidiary may have a trust relationship with the subsidiary. However, other subsidiaries of the same parent corporation may not have a trust relationship with the subsidiary that is the requesting organization. By way of example, FIG. 4 depicts a trust relationship between a requesting organization designated Company X and a plurality of other entities with the trust relationship indicated by the circle 40. The parent corporation of Company X is shown to have a trust relationship with Company X. Additionally, other entities may have a trust relationship with the requesting organization based upon contractual or other obligations, such as ethical obligations, between the requesting organization and the other entities. For example, an auditor or a law firm representing the requesting organization may have a trust relationship with the requesting organization, such as indicated by Sub 1 in the trust relationship of FIG. 4. The trust relationship must be recognized not only by the requesting organization, but by the data source that defines the policies that govern the manner in which the data stored by the database 22 is to be shared, thereby permitting the data to be shared pursuant to a respective policy of the data source with a requesting organization and other entities with which requesting organization has a trust relationship.

The third data source table may be populated, such as by the processing circuitry 12, in various manners. In the embodiment illustrated in FIG. 3C, the third data source table identifies a requesting organization and also identifies the one or more other entities with which the requesting organization had a trust relationship. By way of example, Record 1 of the third data source table of FIG. 3C identifies the requesting organization as Company 1 and the other entities with which Company 1 has a trust relationship as the parent of Company 1 and Sub 1 of Company 2, as also shown in FIG. 4. As such, during subsequent searching of the database 22, policies that permit access by the requesting organization to data provided by the data source and stored by the database will be interpreted to also permit access to the same data provided by the data source to the other entities that have the trust relationship with the requesting organization as defined by the third data source table.

As shown in FIG. 3C, the apparatus 10, such as the processing circuitry 12, of an example embodiment is also configured to optionally populate the third data source table with default access restrictions. These default access restrictions would apply to all data that is to be provided to entities having a trust relationship with a respective requesting organization. For example, these default access restrictions may impose further limitations (beyond those imposed upon the requesting organization) upon the access to the requested data that is provided to the one or more other entities having a trust relationship with respect to a requesting organization. Although various types of default access restrictions may be imposed, one example of a default access restriction is based upon the geolocation of the requesting user and may prevent access to data by users located in a particular state. A default access restriction may be driven by state regulations that correspondingly limit data access.

As noted above, the database 22 of an example embodiment is separate from the memory device 14 that stores the plurality of data source tables 20. In this example embodiment, the apparatus 10 includes means, such as the processing circuitry 12, the memory device or the like, configured to modify one or more of the data source tables stored by the memory device without modifying the data stored by the database. By way of example, the policies that govern the manner in which the data provided by a data source may be shared in response to a query may change or be supplemented over time. For example, these changes to or supplementation of the policies may occur as a result of modifications to the contractual relationship between the data source and a requesting organization and/or may be based upon changes in the regulations governing the provision of data provided by a data source. Regardless of the origin of the change to the policy, the separation of the policies from the data governed by the policies permits the data source tables, such as the second data source table, to be modified based upon the changes in the policy without modifying the data that is subsequently provided in accordance with the policy that is now changed. Thus, the change in the policy may be readily implemented in an efficient manner in accordance with an example embodiment of the present disclosure. In an instance in which a data source table is modified, the prior version of the data source table may also be maintained, along with an indication as to the period of time during which the prior version of the data source table was effective, thereby maintaining a comprehensive record for audit purposes.

Once the data source tables have been populated by the processing circuitry 12 and stored by the memory devices 14 as described above, the apparatus 10 of an example embodiment is configured to provide for selective searching of at least a portion of the database 22. As such, reference is now made to FIG. 5 which depicts the operations performed, such as by the apparatus of an example embodiment, in order to selectively search at least a portion of the database. As shown in block 50 of FIG. 5, the apparatus of an example embodiment include means, such as the processing circuitry, the communication interface 16, the user interface 18 or the like, configured to receive a query having a query context and requesting access to data stored by the database. The query context may include one or more of a requesting user context, a requesting application, a data type or a PoU. The user context of an example embodiment includes the requesting organization and/or the requesting user role. Thus, the query provides the information necessary for the apparatus, such as the processing circuitry, to evaluate the query in relation to the policies that govern access to the data stored by the database in order to determine the data, if any, that is responsive to the query.

The apparatus 10 includes means, such as the processing circuitry 12 or the like, configured to review, in response to the query, the one or more data source tables including the first data source table that define each of the plurality of data sources of data stored by the database 22. See block 54 of FIG. 5. One example of a first data source table has been described above and is depicted in FIG. 3A. In relation to the review of the one or more data source tables including the first data source table, the apparatus includes means, such as the processing circuitry or the like, configured to identify one or more data sources that provided data that is accessible in response to the query. See block 56 of FIG. 5. As described below, the accessibility of the data provided by a data source is dependent upon the relationship of the policy that governs the access restrictions imposed upon the data provided by the data source and the information provided by the query.

Figure 5:
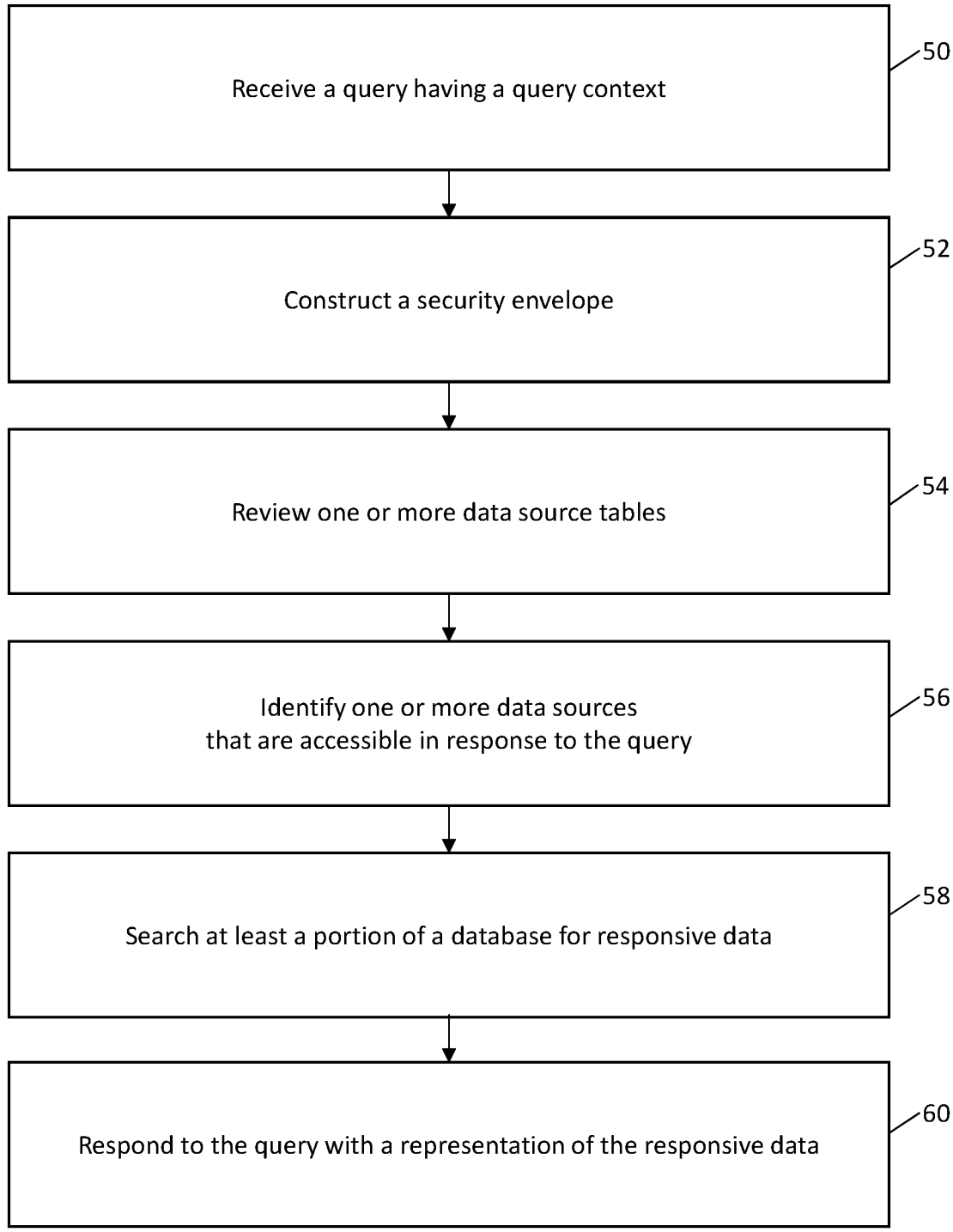
FIG. 5 is a flow chart illustrating operations performed, such as by the apparatus of FIG. 1, in order to selectively search at least a portion of a database in accordance with an example embodiment of the present disclosure.

As shown in block 58 of FIG. 5 and after having identified the data source(s) that provided data identified to be accessible in response to the query, the apparatus 10 of this example embodiment also includes means, such as the processing circuitry 12 or the like, configured to search at least a portion of the database 22 for responsive data, that is, data that: (i) was provided by the one or more data sources that provided data that was identified to be accessible in response to the query and (ii) is responsive to the query. Thus, the portion of the database that is searched is that portion that includes data provided by one or more data sources that was determined to be accessible in response to the query, such as by being data provided by a data source having a policy governing the accessibility of the data provided by the data source that is satisfied by the information associated with the query. During the search of the portion of the database, the apparatus, such as the processing circuitry, is configured to identify data that satisfies the query, such as by being of the requested data type.

The apparatus 10 of this example embodiment also includes means, such as the processing circuitry 12, the communications interface 16, the user interface 18 or the like, configured to respond to the query with representation of the responsive data. By responding to the query, the apparatus, such as the processing circuitry, may be configured to provide the responsive data itself. Alternatively, the apparatus, such as the processing circuitry, may respond to the query by providing access to that portion of the database that stores the responsive data. In addition, while the data itself may be provided, other representations of the data may, instead, be provided, such as by providing a de-identified version of the data, an aggregated form of the data or the like. In this regard and as described above, the policies that define the access restrictions imposed upon the data may define the form in which the data is permitted to be provided to a requesting organization with the representation of the responsive data that is provided in response to the query being consistent with the form defined by the policy via which the data is being provided. In instances in which the data was previously normalized, the data may be transformed prior to being provided in response to the query so as to return to the same format in which the data was originally provided.

In an example embodiment, the search of the database 22 for the responsive data is limited by searching only the portion of the database that stores data that is provided by the one or more data sources that were identified to have provided data that is accessible in response to the query without searching other portions of the database that store data provided by one or more other data sources that provided data that has been determined to not be accessible in response to the query. For example, those portions of the database that store data provided by a data source pursuant to one or more policies that are not satisfied by the query are not searched. As such, the search of the database may be conducted in an efficient manner, thereby conserving processing resources and time and providing a technological improvement relative to data rights management systems that search the entirety of the database for responsive data.

In an example embodiment, the query context may be represented by a security envelope that, in turn, is utilized in conjunction with the review of the data source tables. In this example embodiment, the apparatus 10 includes means, such as the processing circuitry 12 or the like, configured to construct a security envelope in response to the receipt of a query. See block 52 of FIG. 5. The security envelope for a respective query includes the query context including one or more of the requesting user context, the requesting application, the data type and/or the PoU of the requested data. In this example embodiment in which a security envelope is constructed, the apparatus, such as the processing circuitry, is configured to review the one or more data source tables by reviewing the one or more data source tables based upon the security envelope constructed for the query in order to identify the one or more data sources that provided data that is accessible in response to the query as represented by the security envelope.

As described above, the one or more data source tables stored by the memory device 14 may include a second data source table that identifies, for each of the one or more data sources, one or more policies defining use of the data provided by a respective data source. In this example embodiment, the apparatus 10, such as the processing circuitry 12 or the like, is configured to identify the one or more data sources that provide data that is accessible in response to the query by identifying the one or more data sources having one or more policies that are satisfied by the query. In this regard, the identification of the data sources that provide data that is accessible in response to a query may include a comparison of the policies associated with each of the data sources identified by the first data source table, or at least each of the data sources identified by the first data source table that provided data that is responsive to the query, with the information provided by the query, such as the query context, in order to identify the one or more data sources having a policy that will be satisfied by the query. The one or more data sources having a policy that is satisfied by the query are then identified as the one or more data sources that provide data that is accessible in response to the query.

As such, the apparatus 10, such as the processing circuitry 12, this example embodiment is then configured to search at least the portion of the database 22 for responsive data and to respond to the query with a representation of the responsive data in a manner that is in compliance with the one or more policies that are identified to govern accessibility of the responsive data in response to the query. In other words, the apparatus, such as the processing circuitry, is configured to search at least the portion of the database and to respond to the query in a manner that is consistent with the policies of the one or more data sources that are satisfied by the query. As such, the apparatus, such as the processing circuitry, of this example embodiment not only identifies the responsive data stored in the database in an efficient manner, but does so in a manner that consistently honors the access restrictions imposed upon the data provided by the data sources as represented by the policies of the various data sources.

As also described above and as shown in FIG. 3C, the one or more data source tables may also include a third data source table that identifies, for at least some of the one or more data sources, one or more entities that have a trust relationship with a requesting organization. In this example embodiment, the apparatus 10 also includes means, such as the processing circuitry 12 or the like, configured to identify one or more entities that have a trust relationship with the requesting organization. As such, the apparatus, such as the processing circuitry, of this example embodiment is configured to identify the one or more data sources that provide data that is accessible in response to the query in a manner that is in compliance with the one or more entities that are identified to have a trust relationship with the requesting organization. For example, the policy of a data source that provides data for storage in the database 22 may identify a requesting organization as being authorized to access at least some form of the data. In accordance with the trust relationship described in conjunction with this example embodiment, one or more other entities having a trust relationship with the requesting organization, such as defined by the third data source table, may be permitted to access the same data pursuant to the policy of the data source that is directed to the requesting organization since the one or more other entities that have an identified trust relationship with the requesting organization are treated as a proxy for the requesting organization.

Changes in the trust relationships may be efficiently represented by changes to the third data source table. For example, changes based upon modifications in familial corporate relationships and/or changes in contractual relationships with other entities, such as auditors or law firms, may be readily and efficiently represented by changes to the third data source table without any modification to the data stored by the database 22.

By way of example, a database 22 may be populated by data provided from three data sources, designated Data Source 1, Data Source 2 and Data Source 3. As represented by the first data source table of FIG. 3A, Data Source 1 provides data having a data type of 270/271 data, a source organization of Company X and a sourcing application of an clinical network clearinghouse (CNC) application. The data provided by Data Source 1 may be subject to two policies, designated Policy 1 and Policy 2 that define the access restrictions by which access to the data provided by Data Source 1 is governed. Information regarding the policies may be stored by the second data source table with the entries or records of Policy 1 and Policy 2 stored by the second data source table and linked to the entry or record for Data Source 1 in the first data source table by the mapping fields of the first and second data source tables. In this example embodiment, Policy 1 of Data Source 1 may define the requesting user context to include the requesting organization of Company Y and all requesting user roles. Policy 1 may also indicate that any PoU is permitted, but may limit the requesting application to an CNC application. In an instance in which Policy 1 is satisfied, the full data provided by Data Source 1 may be provided for any use. Policy 2 may also define the same user context, but may limit the PoU to analytical purposes and may limit the requesting application to an audit application. If the access restriction imposed by Policy 2 are satisfied, the data that is provided is limited to de-identified data for which read-only access is permitted.

With respect to Data Source 2, the first data source table of FIG. 3A indicates that Data Source 2 provides data having a data type of 270/271 data, a source organization of Company Y and a sourcing application of a audit application. The data provided by Data Source 1 may be subject to three policies, designated Policy 3, Policy 4 and Policy 5 that define the access restrictions by which access to the data provided by Data Source 2 is governed. Information regarding the policies may be stored by the second data source table with the entries or records of Policy 1 and Policy 2 stored by the second data source table and linked to the entry or record for Data Source 1 in the first data source table by the mapping fields of the first and second data source tables. In this example embodiment, Policy 3 of Data Source 2 may define the requesting user context to include the requesting organization of Company 1 and all requesting user roles. Policy 3 may also indicate that any PoU is permitted, but may limit the requesting application to an audit application. In an instance in which Policy 3 is satisfied, the full data provided by Data Source 1 may be provided for any use. Policy 4 may also define the same user context, but may limit the PoU to analytical purposes and may limit the requesting Application to a CNC application. If the access restriction imposed by Policy 4 is satisfied, the data that is provided is limited to de-identified data for which read-only access is permitted. Policy 5 of Data Source 2 may define the requesting user context to include the requesting organization of Company Y and may limit the requesting user roles to auditing. Policy 5 may correspondingly limit the PoU to audit purposes and may limit the requesting application to an audit application. If the access restriction imposed by Policy 5 is satisfied, the full data that is provided by Data Source 2 may be provided with read-only access being permitted.

As represented by the first data source table of FIG. 3A, Data Source 3 provides data having a data type of payments data, a source organization of Company X and a sourcing application of a payments application. The data provided by Data Source 3 may be subject to four policies, designated Policies 6-9, that define the access restrictions by which access to the data provided by Data Source 3 is governed. Information regarding the policies may be stored by the second data source table with the entries or records of Policies 6-9 stored by the second data source table and linked to the entry or record for Data Source 3 in the first data source table by the mapping fields of the first and second data source tables. In this example embodiment, Policy 6 of Data Source 3 may define the requesting user context to include the requesting organization of Company 1 and all requesting user roles. Policy 6 may also indicate that any PoU is permitted, but may limit the requesting application to a payments application. In an instance in which Policy 6 is satisfied, the full data provided by Data Source 1 may be provided for any use. Policy 7 may define the requesting user context to include the requesting organization of Company X and all requesting user roles. Policy 7 may also indicate that any PoU is permitted, but may limit the requesting application to an audit application. If the access restriction imposed by Policy 7 are satisfied, the full data that is provided by Data Source 3 may be provided with access limited to read-only access. Policy 8 of Data Source 3 may define the requesting user context to include the requesting organization of Company X and all requesting user roles. Policy 8 may also indicate that the PoU is limited to auditing purposes and may limit the requesting application to a CNC application. In an instance in which Policy 8 is satisfied, the full data provided by Data Source 1 may be provided with access limited to read-only access. Policy 9 of Data Source 3 may define the requesting user context to include the requesting organization of Company X and may limit the requesting user roles to payment roles. Policy 9 may also indicate that the PoU is limited to auditing and the requesting application is a CNC application. In an instance in which Policy 9 is satisfied, the full data provided by Data Source 3 is subject to a denial for any use. In this regard, in an instance in which Policy 9 is satisfied, access to the data provided by Data Source 3 will be denied, regardless of whether or not any of the other policies of Data Source 3 which would purport to grant access to at least some of the data provided by Data Source 3 have been satisfied.

Once the data source tables have been populated for Data Source 1, Data Source 2 and Data Source 3 of this example, the apparatus 10 is configured to provide for a selected search of the database 22 in response to a query. In an example in which the query is received that has a query context that identifies the requesting organization to be Company Y and identifies the requesting user role to be an auditor, the requesting application to be an audit application, the requested data type to be 270 data and PoU to be for auditing purposes, the apparatus, such as the processing circuitry 12, is configured to review the data source tables 20 and to identify that the data provided by Data Source 2 is accessible in response to the query, but that the data provided by Data Sources 1 and 3 is not accessible in response to the query. In this regard, the query satisfies Policy 5 of Data Source 2, but does not satisfy the policies of the other data sources. Thus, the data provided by Data Source 2 and stored by the database is searched to identify the responsive data and a representation of the responsive data is provided in response to the query. In this regard, read-only access is provided to the full data pursuant to Policy 5 of Data Source 2. As this example illustrates, as long as one or more data policies of a data source are satisfied, a search of a portion of the database may be conducted, even though other policies of the same database are not satisfied. Similarly, in an instance in which two or more policies of the same data source are satisfied, the apparatus, such as the processing circuitry, may permit the database to be searched in accordance with the policy that has been satisfied that provides for the most broad access of data from the database.

In another example in which the query is received that has a query context that identifies the requesting organization to be Company X and identifies the requesting user role to be payments, the requesting application to be an audit application, the requested data type to be any type of data and PoU to be for payment purposes, the apparatus 10, such as the processing circuitry 12, is configured to review the data source tables 20 and to identify that the data provided by Data Source 3 is accessible in response to the query, but that the data provided by Data Sources 1 and 2 is not accessible in response to the query. In this regard, the query satisfies Policy 7 of Data Source 3, but does not satisfy the policies of the other data sources. Thus, the data provided by Data Source 3 and stored by the database is searched to identify the responsive data and a representation of the responsive data is provided in response to the query. In this regard, read-only access is provided to the full data pursuant to Policy 7 of Data Source 3.

In a further example in which the query is received that has a query context that identifies the requesting organization to be Sub 1 of Company 2 and identifies the requesting user role to be payments, the requesting application to be an audit application, the requested data type to be payments data and the PoU to be correspondingly for payment purposes, the apparatus 10, such as the processing circuitry 12, is configured to review the data source tables 20 and to identify that the data provided by Data Source 3 is accessible in response to the query, but that the data provided by Data Sources 1 and 2 is not accessible in response to the query. In this regard, the query satisfies Policy 7 of Data Source 3, but does not satisfy the policies of the other data sources. In this regard, Policy 7 specifies that the requesting organization be Company X. However, the third data source table of FIG. 3C defines the requesting organization of the query, that is, Sub 1 of Company 2, to be in a trust relationship to Company X such that Sub 1 of Company 2 is also considered to be an appropriate requesting organization pursuant to Policy 7 and the corresponding trust relationship. Thus, the data provided by Data Source 3 and stored by the database is searched to identify the responsive data and a representation of the responsive data is provided in response to the query. In this regard, read-only access is provided to the full data pursuant to Policy 7 of Data Source 3.

In yet another example in which the query is received that has a query context that identifies the requesting organization to be Company X and identifies the requesting user role to be payments, the requesting application to be a CNC application, the requested data type to be payments data and PoU to be for auditing purposes, the apparatus 10, such as the processing circuitry 12, is configured to review the data source tables 20. None of the policies of Data Source 1 or Data Source 2 are satisfied by the query such that access is not permitted to the data provided by the respective data sources. Although Policies 6 and 7 of Data Source 3 are not satisfied by the query, Policy 8 of Data Source 3 is satisfied by the query and indicates that access would be permitted to the data provided by Data Source 3. However, Policy 9 of Data Source 3 is also satisfied by the query and indicates access to the data provided by Data Source 3 is to be denied. In this instance, the satisfaction of a policy that denies access to data supersedes the satisfaction of a policy that would otherwise permit access to the same data, such that no data is provided in response to the query.

FIGS. 2 and 5 illustrate flowcharts describing the operation of apparatuses, methods, and computer program products according to example embodiments of the invention. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus 10 employing an embodiment of the present invention and executed by processing circuitry 12 of the apparatus. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for selectively searching at least a portion of a database, the method comprising:
   storing one or more data source tables in a memory device containing data source information associated with a plurality of data sources;
   receiving a query having a query context including one or more of requesting user context, requesting application, data type or purpose of use;
   constructing a security envelope in response to receipt of the query, wherein the security envelope for a respective query includes the query context including one or more of the requesting user context, the requesting application, the data type or the purpose of use;
   in response to the query, executing, using processing circuitry, a review of the one or more data source tables including a first data source table that defines each of a plurality of data sources of data stored by the database, wherein the first data source table separately identifies, for each of the plurality of data sources, a purpose of use, which specifies a limitation on use of data sourced from the respective one of the plurality of data sources, and one or more of a source organization, a data type, or a sourcing application, and wherein reviewing the one or more data source tables comprises identifying one or more data sources that provide data that is accessible in response to the query and denying access to data provided by one or more sources that are restricted based upon the security envelope constructed for the query;
   executing, using the processing circuitry, a search on at least the portion of the database for responsive data that: (i) was provided by the one or more data sources that were identified to provide data that is accessible in response to the query and (ii) is responsive to the query; and
   responding to the query with a representation of the responsive data,
   wherein executing, using the processing circuitry, the search on at least the portion of the database for responsive data comprises searching only the portion of the database that stores data that was provided by the one or more data sources that were identified to provide data that is accessible in response to the query without searching other portions of the database that store data provided by one or more other data sources.

2. A method according to claim 1 wherein the one or more data source tables also include a second data source table that identifies, for each of the one or more data sources, one or more policies defining use of the data provided by a respective data source, and wherein identifying one or more data sources that provide data that is accessible comprises identifying the one or more data sources having one or more policies that are satisfied by the query.

3. A method according to claim 2 wherein executing, using the processing circuitry, the search on at least the portion of the database for responsive data and responding to the query with a representation of the responsive data are performed in compliance with the one or more policies that are identified to govern accessibility of the responsive data in response to the query.

4. A method according to claim 1 wherein the one or more data source tables also include a third data source table that identifies one or more entities that have a trust relationship with a requesting organization, and wherein the method further comprises identifying one or more entities that have a trust relationship with the requesting organization.

5. A method according to claim 4 wherein identifying one or more data sources that provide data that is accessible in response to the query is performed in compliance with the one or more entities that are identified to have a trust relationship with the requesting organization.

6. A method according to claim 1 wherein requesting user context includes at least one of requesting organization or requesting user role.

7. An apparatus configured to selectively search at least a portion of a database, the apparatus comprising:
a memory device; and
processing circuitry configured to perform operations comprising:
storing one or more data source tables in the memory device containing data source information associated with a plurality of data sources, the one or more data source tables including a first data source table that defines each of a plurality of data sources of data stored by the database, wherein the first data source table separately identifies, for each of the plurality of data sources, a purpose of use, which specifies a limitation on use of data sourced from the respective one of the plurality of data sources, and one or more of a source organization, a data type, or a sourcing application;
receiving a query having a query context including one or more of requesting user context, requesting application, data type or purpose of use;
constructing a security envelope in response to receipt of the query, wherein the security envelope for a respective query includes the query context including one or more of the requesting user context, the requesting application, the data type or the purpose of use;
in response to the query, executing, using the processing circuitry, a review of the one or more data source tables including the first data source table in order to identify one or more data sources that are accessible in response to the query and denying access to data provided by one or more sources that are restricted based upon the security envelope constructed for the query;
executing, using the processing circuitry, a search on at least the portion of the database for responsive data that: (i) was provided by the one or more data sources that were identified to be accessible in response to the query and (ii) is responsive to the query; and
responding to the query with a representation of the responsive data,
wherein executing, using the processing circuitry, the search on at least the portion of the database for responsive data comprises searching only the portion of the database that stores data that was provided by the one or more data sources that were identified to provide data that is accessible in response to the query without searching other portions of the database that store data provided by one or more other data sources.

8. An apparatus according to claim 7 wherein the one or more data source tables also include a second data source table that identifies, for each of the one or more data sources, one or more policies defining use of the data provided by a respective data source, and wherein the operations further comprise:
identifying one or more data sources that are accessible by identifying the one or more data sources having one or more policies that are satisfied by the query.

9. An apparatus according to claim 8 wherein the operations further comprise:
executing, using the processing circuitry, the search on at least the portion of the database for responsive data and responding to the query with a representation of the responsive data in a manner that is in compliance with the one or more policies that are identified to govern accessibility of the responsive data in response to the query.

10. An apparatus according to claim 7 wherein the one or more data source tables also include a third data source table that identifies one or more entities that have a trust relationship with a requesting organization, and wherein the operations further comprise:
identifying one or more entities that have a trust relationship with the requesting organization.

11. An apparatus according to claim 10 wherein the operations further comprise:
identifying one or more data sources that are accessible in response to the query in a manner that is performed in compliance with the one or more entities that are identified to have a trust relationship with the requesting organization.

12. A computer program product for selectively searching at least a portion of a database, comprising:
a non-transitory computer readable storage medium comprising computer readable program code embodied in the medium that is executable by processing circuitry to perform operations comprising:
storing one or more data source tables in the computer readable storage medium containing data source information associated with a plurality of data sources;
receiving a query having a query context including one or more of requesting user context, requesting application, data type or purpose of use;
constructing a security envelope in response to receipt of the query, wherein the security envelope for a respective query includes the query context including one or more of the requesting user context, the requesting application, the data type or the purpose of use;
in response to the query, executing, using the processing circuitry, a review of the one or more data source tables including a first data source table that defines each of a plurality of data sources of data stored by the database, wherein the first data source table separately identifies, for each of the plurality of data sources, a purpose of use, which specifies a limitation on use of data sourced from the respective one of the plurality of data sources, and one or more of a source organization, a data type, or a sourcing application, and wherein reviewing the one or more data source tables comprises identifying one or more data sources that provide data that is accessible in response to the query and denying access to data provided by one or more sources that are restricted based upon the security envelope constructed for the query;

executing, using the processing circuitry, a search on at least the portion of the database for responsive data that: (i) was provided by the one or more data sources that were identified to provide data that is accessible in response to the query and (ii) is responsive to the query; and responding to the query with a representation of the responsive data, wherein executing, using the processing circuitry, the search on at least the portion of the database for responsive data comprises searching only the portion of the database that stores data that was provided by the one or more data sources that were identified to provide data that is accessible in response to the query without searching other portions of the database that store data provided by one or more other data sources.

13. A method according to claim 12 wherein the one or more data source tables also include a second data source table that identifies, for each of the one or more data sources, one or more policies defining use of the data provided by a respective data source, and wherein identifying one or more data sources that provide data that is accessible comprises identifying the one or more data sources having one or more policies that are satisfied by the query.

14. A method according to claim 13 wherein executing, using the processing circuitry, the search on at least the portion of the database for responsive data and responding to the query with a representation of the responsive data are performed in compliance with the one or more policies that are identified to govern accessibility of the responsive data in response to the query.

15. A method according to claim 12 wherein the one or more data source tables also include a third data source table that identifies one or more entities that have a trust relationship with a requesting organization, and wherein the method further comprises identifying one or more entities that have a trust relationship with the requesting organization.

16. A method according to claim 15 wherein identifying one or more data sources that provide data that is accessible in response to the query is performed in compliance with the one or more entities that are identified to have a trust relationship with the requesting organization.

* * * * *